May 26, 1936.   L. J. SIMONS   2,042,027
SOUND ON FILM REPRODUCTION
Filed July 14, 1930    6 Sheets-Sheet 1

INVENTOR
Louis J. Simon

May 26, 1936.  L. J. SIMONS  2,042,027

SOUND ON FILM REPRODUCTION

Filed July 14, 1930   6 Sheets-Sheet 2

INVENTOR
Louis J. Simons

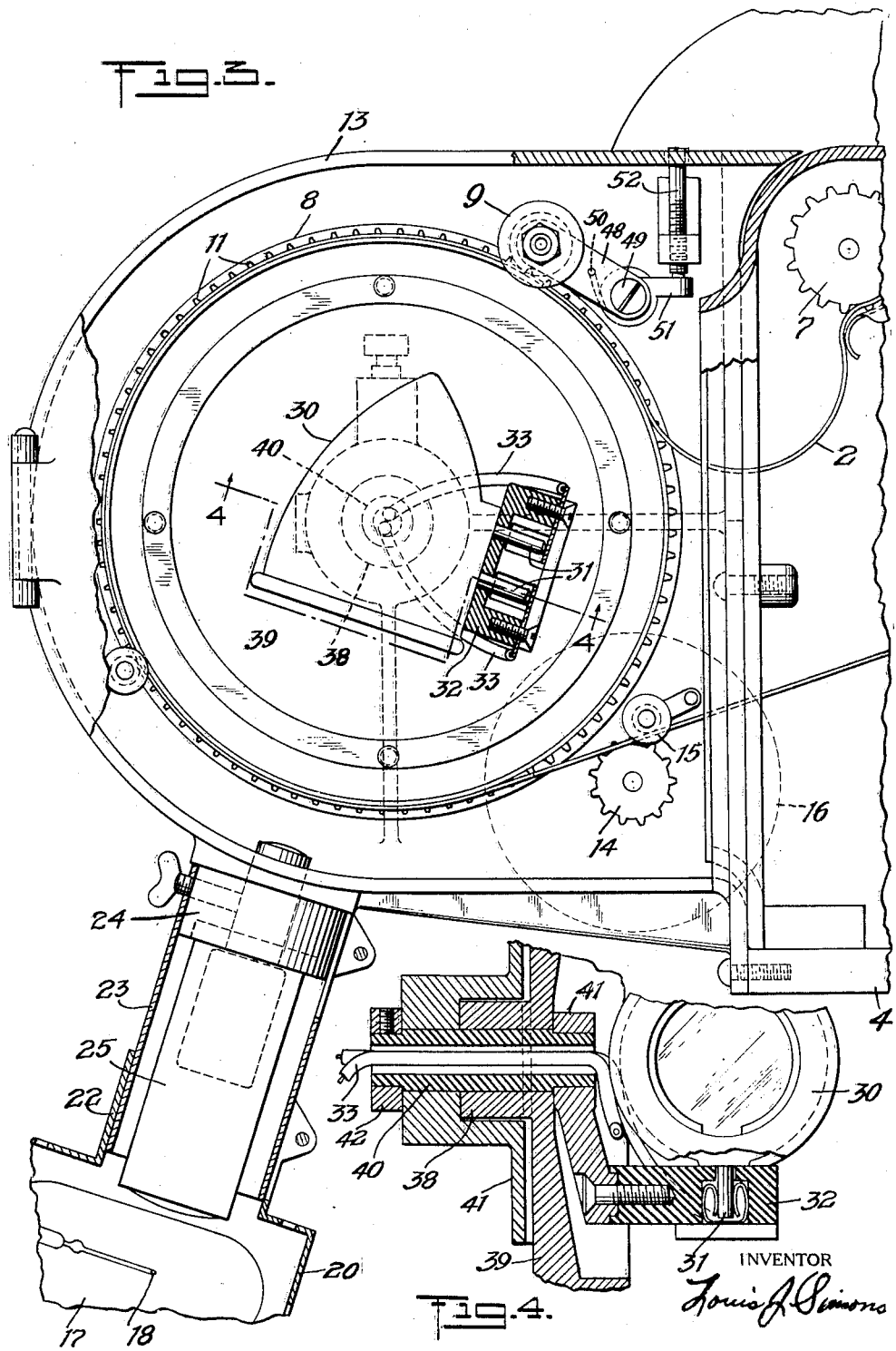

May 26, 1936.    L. J. SIMONS    2,042,027
SOUND ON FILM REPRODUCTION
Filed July 14, 1930    6 Sheets-Sheet 4
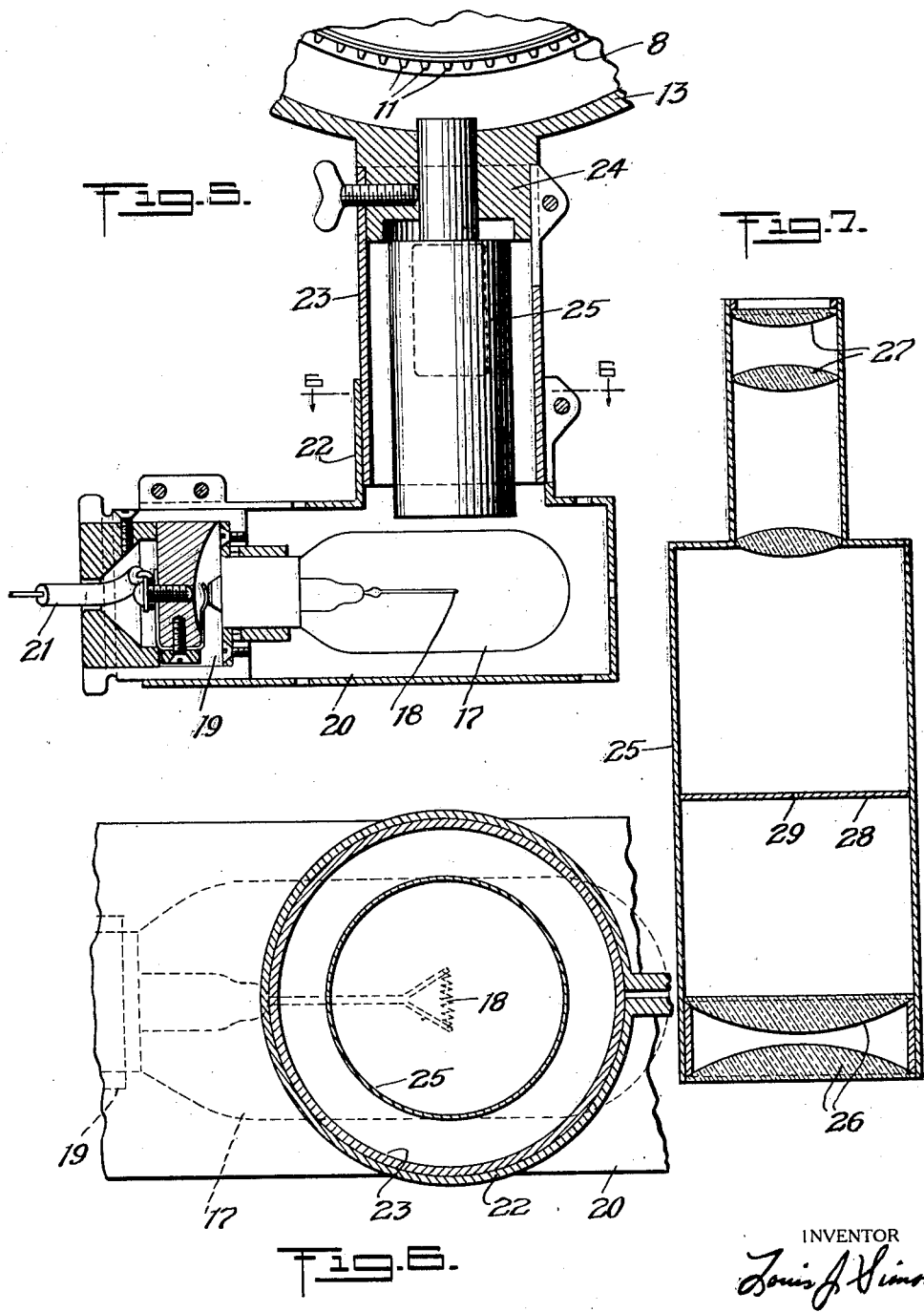
INVENTOR
Louis J. Simons

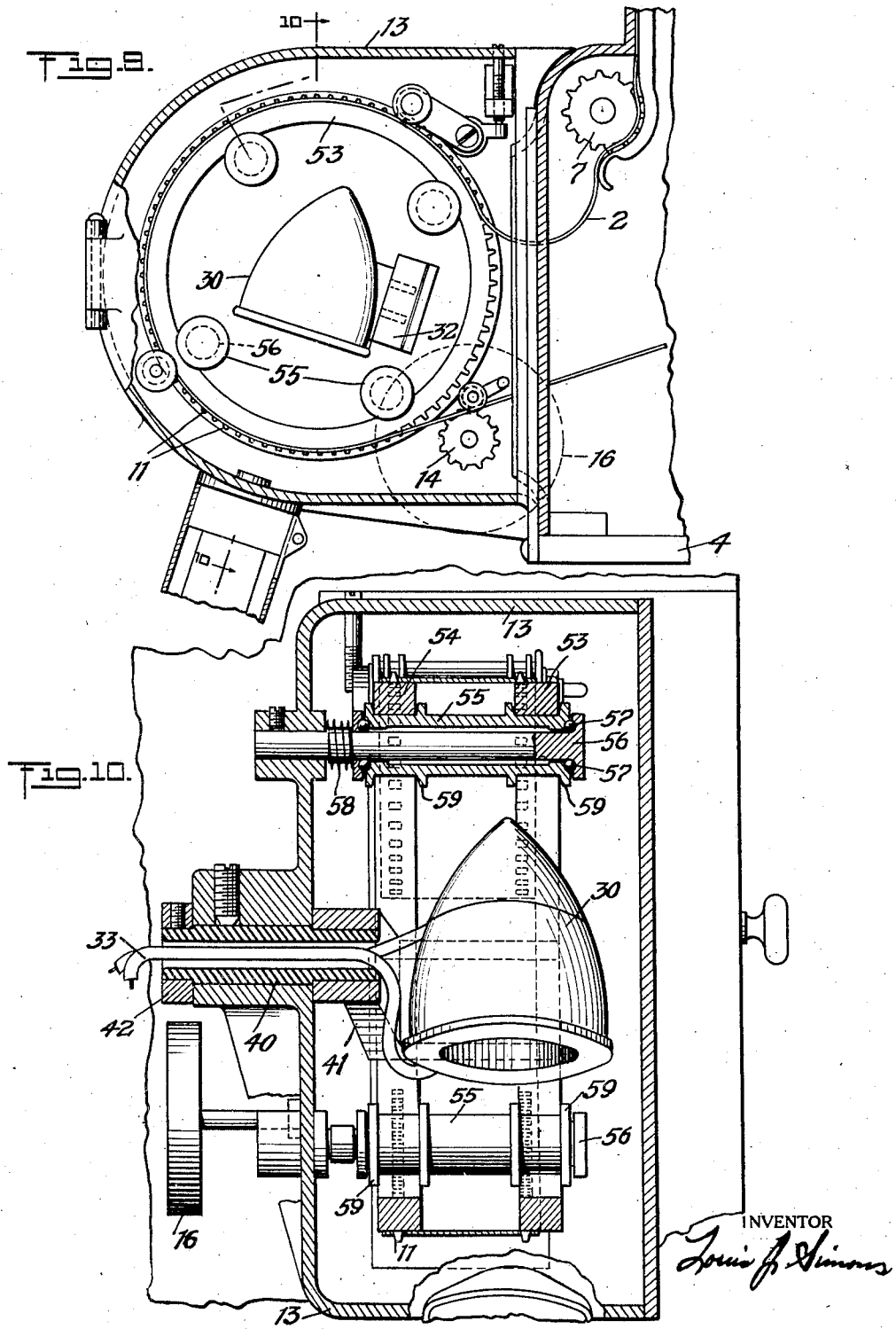

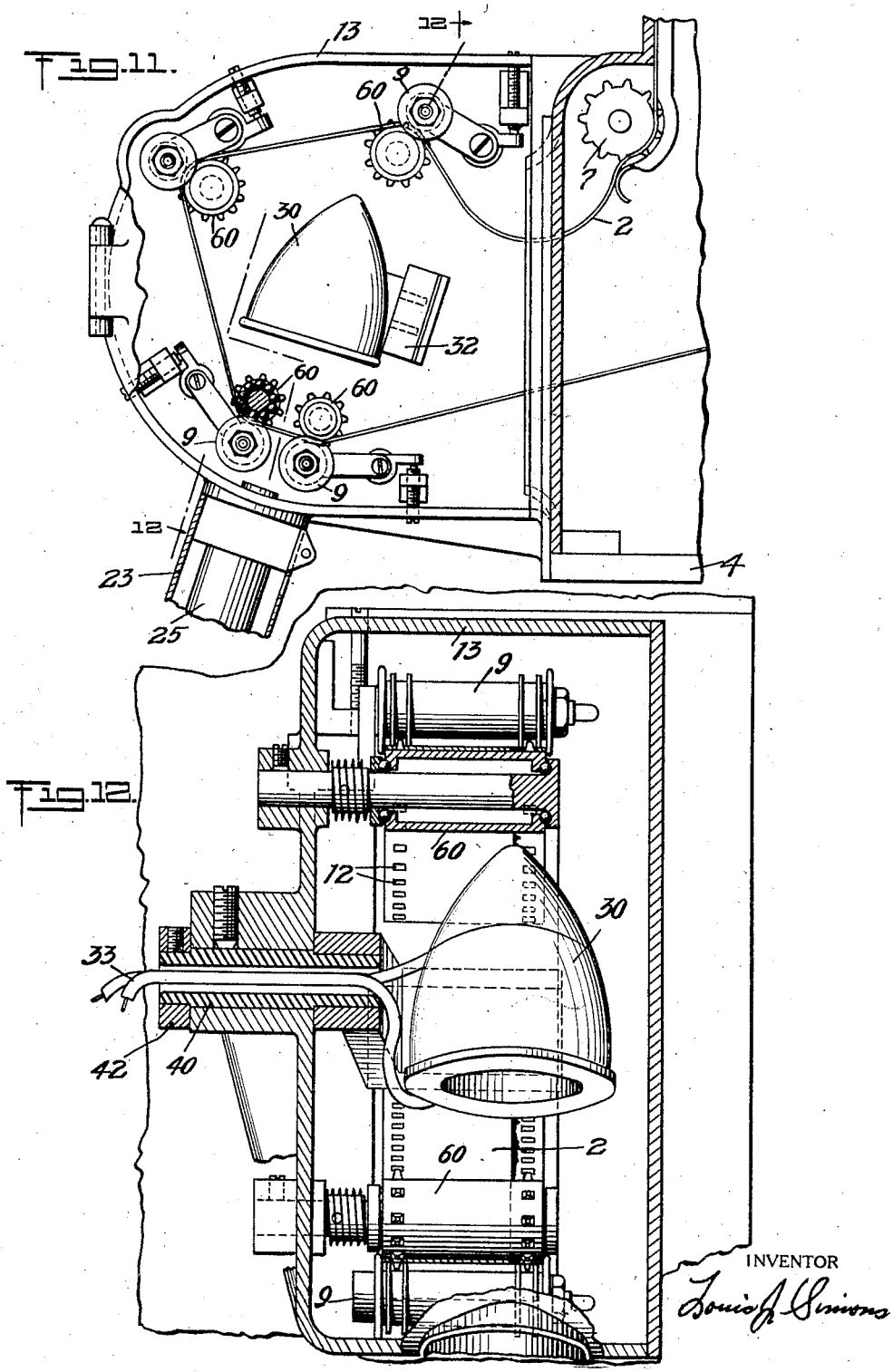

Patented May 26, 1936

2,042,027

UNITED STATES PATENT OFFICE 2,042,027

SOUND ON FILM REPRODUCTION

Louis J. Simons, New York, N. Y., assignor, by mesne assignments, to National Television Corporation, a corporation of Delaware Application July 14, 1930, Serial No. 467,660

1 Claim. (Cl. 88—16.2)

This invention relates to sound on film reproduction and more particularly to its application to what are popularly known at present as talking pictures.

Heretofore methods have been employed utilizing films having sound records photographically reproduced thereon, the films in use being passed in front of a slit through which light is projected for obtaining the translation of the recorded sound waves on the film into actual sound. One of the principal difficulties heretofore experienced has been the detrimental effect both upon the film and in reproduction occasioned by the sliding contact of the film with the structure forming the slit. A further drawback of the previously used constructions is in the apparent necessity of gears, tension on the film, and other mechanical means for actuating the film past the slit. These mechanical devices have set up vibrations in the film and consequent distortions in the light projection and unsatisfactory sound results. Furthermore, the art as heretofore practiced, has utilized a mechanical slit, the size of which is dependent upon purely mechanical considerations amongst which are the necessary dimensions of the illuminating means and the necessary proximity of the slit to the film.

The present invention seeks to overcome the shortcomings of the prior art constructions for the purpose of producing a more efficient structure, which will require less attention and adjustment, and will reproduce the original sound with minimum distortion and with substantial elimination of all extraneous noises caused by the operation of the film.

With these objects in view, the invention consists substantially in the construction, combination, location and relative arrangement of parts, as well as the method employed in reproducing sound from the record film, all as will be more fully hereinafter set forth.

Referring to the accompanying drawings in which like numerals of reference indicate similar parts throughout the several views:

Fig. 3 is a sectional view on line 3—3 of Fig. 2;

Fig. 4 is a sectional view on line 4—4 of Fig. 3;

Fig. 5 is a sectional view of the parts associated with the source of light and a lens housing;

Fig. 6 is a sectional view on line 6—6 of Fig. 5;

Fig. 7 is a longitudinal sectional view of the lens housing;

Fig. 9 is a sectional view showing a modified construction of drum and drum mounting for the film;

Fig. 10 is a sectional view on line 10—10 of Fig. 9;

Fig. 11 is a sectional view showing a further modified construction of the parts associated with the film in its passage around the light sensitive cell; and Fig. 12 is a sectional view on line 12—12 of Fig. 11.

Figure 1:
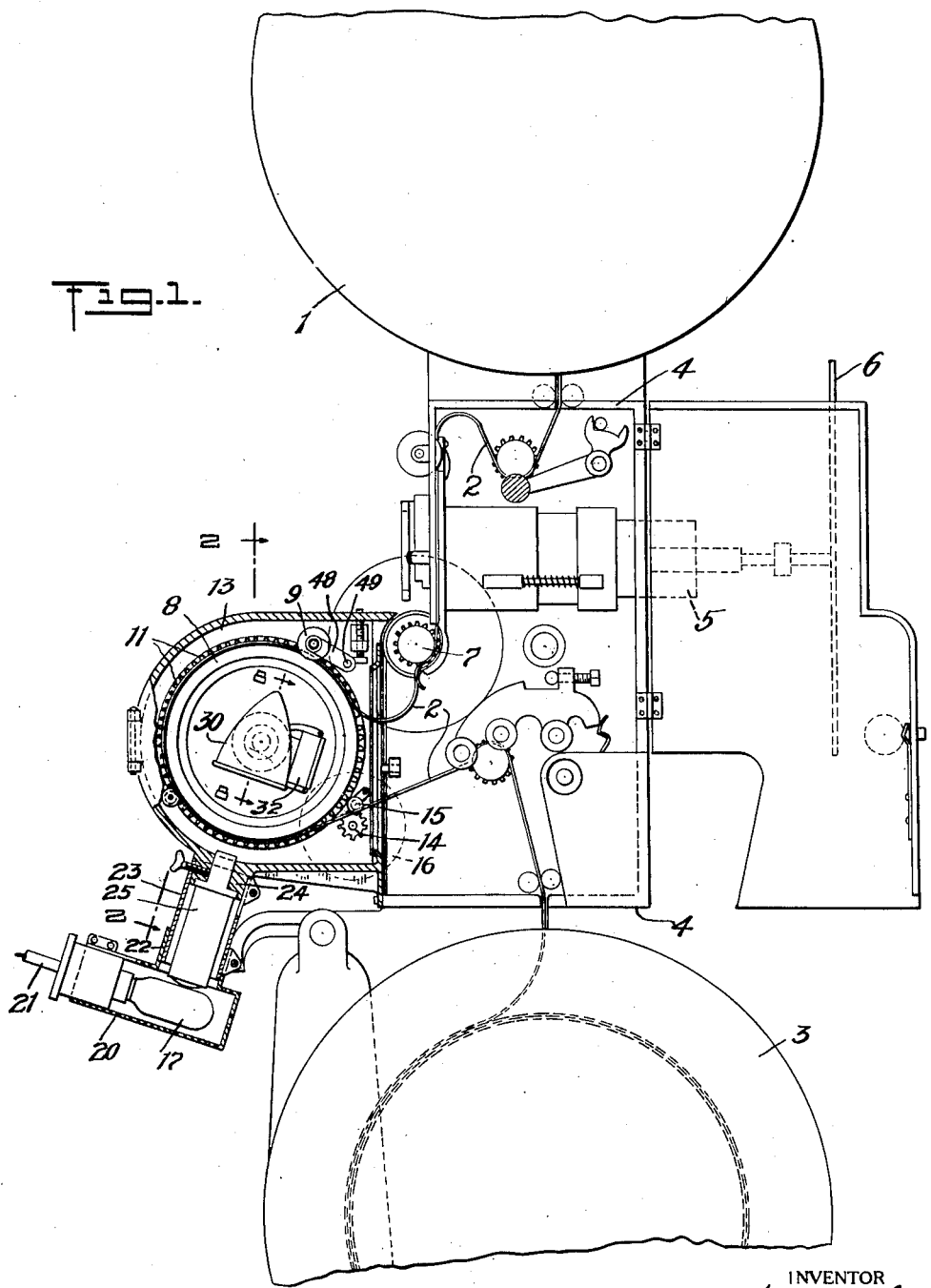
Fig. 1 is a side elevation, with parts in section, of a moving picture machine embodying my invention.

In the specific embodiment of the invention illustrated in said drawings, the reference numeral 1 indicates, as part of a moving picture machine, a reel from which film 2 is unwound, and reference numeral 3 indicates a reel upon which the film is re-wound in operating the moving picture machine in projecting the picture on the screen. As the structure of moving picture machines in general is old, with the various means of operating the reels to wind and unwind the film, no attempt will be made in this specification to go into the details of construction other than to say that the film 2 passes across a light stream for projection purposes, a housing 4 being provided containing a proper lens focusing case 5, and a shutter 6. The film is passed across the light path with an intermittent movement, being controlled in such movement by a gear 7. After passage of the film beyond the intermittent driving gear 7, the same is usually passed to the winding reel 3 with some looseness or play, technically known as "the loop", so as not to actuate the film in the passage thereof across the light stream by the winding reel.

The film is subjected to a second light stream in the passage thereof from the intermittent gear to the winding reel, this second light stream being for purposes of translating the sound records into actual sound. Heretofore, it has been common practice to lower the winding reel and draw the film in front of a slit in a secondary housing below the projection housing 4. As the actuating means for thus passing the film is gear operated, there is a microphonic vibration, and this vibration appears in the reproduction of the sound record from the film.

In the present invention I do not rely upon a straight passage of film in front of a slit with gear-driven actuation thereof as in the prior art.

The film is passed around a supporting means, such as a drum 8 which preferably has sufficient mass to eliminate or prevent film vibration in the portion of the film which lies upon the periphery of the drum. The film does not have any sliding contact but merely feeds onto the supporting means or drum at one point and off of the supporting means or drum at another point. As shown, the film extends substantially around the drum and therefore has a very considerable surface contact therewith. There is a loop of film from the intermittent actuating gear 7 to the drum for absorbing the greater part of the vibratory motion in that end of the film. Nevertheless, the film passes no less than half way around the carrier or supporting drum 8 to the position where the second mentioned light stream is applied thereto, as a result of which none of the vibratory motion of the primary actuation of the film reaches the part of the film where the second light stream is applied. The light stream is applied to the film at a part of the length of the film which is supported on the drum and from the point where the second light stream is applied to where the film leaves the drum there is a material surface contact ample to eliminate any vibratory motion which exists in the film due to its actuation in winding it upon winding reel 3. Both the direction of the film and its vibratory motion are controlled to a considerable extent by means of properly placed guide and pressure rollers 9, intervening between the winding reel 3 and the drum 8.

The present invention seeks to overcome the detrimental effects of rotating the drum and in doing so avoids any driving impulse to the drum other than the film itself. While drum 8 is shown with a peripheral series of sprocket teeth 11, which register with the usual holes 12 of one of the series of holes provided in the film, such teeth are not deemed essential and may be omitted. In either event, the film will perform the function of a driving chain or belt for the drum, and because of the arrangement of parts as well as the inertia of the drum, the film will not be subject to vibrations at the point where the second light stream is applied.

The present invention seeks to utilize picture projecting machines as now on the market and in use. In order to change over a moving picture machine according to the method heretofore practiced, it has been necessary to reconstruct the same in order to lower the winding reel and obtain the necessary room for the light slit and associated parts. In the construction shown, I prefer to mount a supplemental housing 13 at the rear of the main or projection housing 4. The film is passed into this supplemental housing 13 around the drum and back into the projection housing where it is mounted and operated as heretofore. The film is provided with the usual loop below the intermittent gear, and from the loop passes into the supplemental housing. It is therefore not only a simple matter to mount my device upon a moving picture machine of present day construction, but it is also a simple matter to thread the film and to operate the machine.

As a further feature of this invention, I would point out that it has been common practice heretofore to provide a distance of nineteen frames between the projection lens and the light slit. The manufacture of films is therefore standardized to position the sound record that distance in advance of the picture record. The drum is properly proportioned and the light stream properly placed with respect to the drum to obtain this same distance of nineteen frames on the film between the two light streams in my invention.

Heretofore, with films having intermittent actuation, it has been attempted to iron out the vibrations existent in the film, this ironing process consisting usually in a frictional contact of the film with the portion of the machine providing the slit and rollers adjacent thereto, but has proved entirely unsuccessful. The present invention seeks to obtain the sound reproduction from a portion of the film wherein there is no vibration to be ironed out. While the drum 8, or other carrier, may have sufficient mass to obtain a satisfactorily steady passage of the film in front of the light stream, other means may be employed for insuring a steady, continuous movement of the film. For this purpose I have shown the film, where leaving the drum, as actuating a sprocket 14, the film being held in contact with said sprocket by a pressure roller 15. The sprocket is fixed upon a suitable shaft transverse to the film, said shaft having one end projecting through the housing and carrying a fly wheel 16 thereon. As the film is moved along to be wound upon the winding reel, it will actuate said gear 14 and fly wheel 16, the momentum of which will serve to very materially steady the film and obtain a constant steady pull of the film on the carrier or drum 8.

One of the important features of the present invention is the said second light stream and associated parts for producing, controlling and registering the same. As shown more in detail in Figs. 5, 6 and 7, the production of the light stream is preferably by means of a lamp 17 having a transverse filament 18. This lamp is mounted in an appropriate socket 19 within a housing 20 in an electric circuit introduced by a wire 21 and completed by the metallic parts forming the shell of the socket. The housing 19 is provided with a transverse sleeve 22 opposite the lamp 17 and preferably so arranged that the filament 18 will be substantially in a plane parallel to one defined by a diameter of said sleeve. The sleeve preferably has a telescopic extension 23 projecting outwards therefrom, said extension engaging upon an annular boss 24 formed with the housing which encloses the carrier or drum 8. The parts are so arranged that the axes of said sleeve and extension are coincident and intersect at right angles the axis of rotation of the drum. Within the sleeve and the boss is positioned a lens casing 25, said casing having in it a suitable arrangement of lenses for accomplishing the purpose of properly directing the light stream. As here shown, the arrangement of lenses includes a pair of focusing lenses 26 adjacent the end of said casing toward the light, and another bank of lenses 27 at the opposite end of the casing away from the light. Interposed between the two banks of lenses is a shield 28 having a diametric slit 29 at the middle thereof, and which, except for said slit, entirely separates the two ends of the casing so that the only light which can pass from one end of the casing to the other must pass through said slit. By virtue of the focusing lenses 26, and by arranging the slit 29 parallel to the filament 18, an image of the filament can be thrown against the slit 29. For mechanical reasons, slit 29 must necessarily have a material width, and heretofore the fact that the slit directing the light to the film necessarily had such a definite width, resulted in translating too much of the sound record at one time. By the present construction, it will be noted that the slit is a long ways from the film and I am thus enabled to utilize the lenses 27 for projecting an infinitely reduced image of this slit 29 upon the film. The importance of this feature cannot be too strongly emphasized as the reduction of the length of film receiving the light from the slit at any moment to a minimum tends to clarify the reproduction of the sound from the film.

Figure 8:
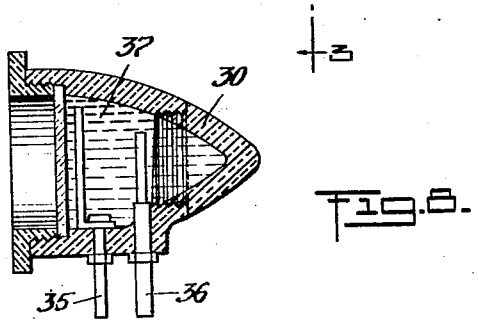
Fig. 8 is a sectional view of the light-sensitive cell which I prefer to employ taken on line 8—8 of Fig. 1.

The means for receiving the light impression is preferably placed within the circumferential area of carrier 8. As here shown, I provide a light sensitive cell 30 mounted in suitable manner, as by means of prongs 31, in a socket 32 from which wires 33 are connected to convey the electrical impulses or variations from the light sensitive cell to a sound producing apparatus (not shown) of suitable construction. Preferably the said light sensitive cell, as shown in Figure 8, is of a type wherein the electrodes 35, 36 are within a liquid 37, so as to avoid any microphonic noise reproduction due to vibration of the machine and particularly due to the location of said light sensitive cell within drum 8. Heretofore it has been attempted to use light sensitive cells in connection with sound reproduction from films, but the results have been unsatisfactory and the attempts proved only moderately successful. I am now able to obtain entirely satisfactory results and successful operation by employing a light sensitive cell using liquid therein. The cell is mounted in the path of the light stream from lamp 17, that is to say, in axial alignment with the several lenses 26—29. Since the cell is within the drum 8 the light stream has to pass through the film before impinging upon the light cell. Consequently the light which reaches the cell will be affected by the record made upon the film.

It will be observed by reference to Figs. 1 to 4 more particularly, that drum 8 is constructed as a rim, one edge only of which is supported directly from a hub 38 by a disc 39. This construction, therefore, leaves the drum open at one side, and the parts are so arranged that the film will project beyond the open side of the drum an appropriate distance such that the sound record on the film will be exposed beyond the said edge of the drum. The teeth 11, or other film guiding means, are provided circumferentially of the drum toward the closed side thereof. It will also be noted that the hub of the drum is rotatedly mounted upon a fixed sleeve 40 forming a bearing for the hub, said sleeve having a bracket 41 secured upon the inner end thereof and having a lock nut 42 applied at the outer end thereof. Consequently, the bracket 41 will remain stationary and will also act to retain the hub against longitudinal displacement. Bracket 41 is utilized to support and rigidly mount the socket 32 for the light sensitive cell.

Figure 2:
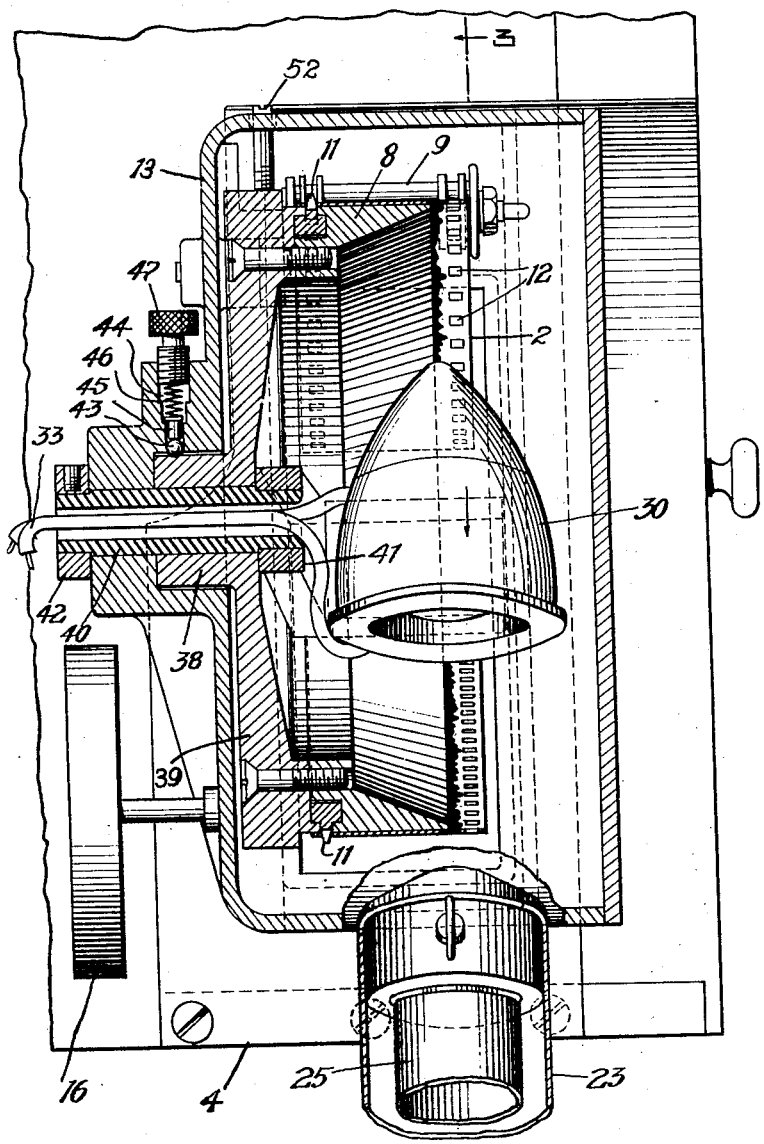
Fig. 2 is a sectional view on line 2—2 of Fig. 1.

As shown more particularly in Fig. 2, rotation of the drum or film carrier may be governed as found desirable so as not to run too freely and injure the film. For this purpose a means for introducing friction in rotation of the drum is provided such as a ball 43 in peripheral contact with the hub 38. This ball is positioned within a radial hole 44 in housing 13 and is held in the hole by a plunger 45, pressed thereagainst by a spiral spring 46 in turn held compressed by the inner end of a thumb screw 47. Adjustment of this thumb screw will vary the pressure of the spring, and consequently the frictional engagement of the ball with the hub may be obtained to secure the desired operation of the film carrier.

The housing 13 provides a light proof enclosure containing the light sensitive cell and prevents undesired light reaching the sensitive face thereof. Access may be had to this enclosure by opening a suitable door which is at the side of the enclosure toward the open side of the drum for purposes of more convenient replacement or inspection of the light sensitive cell, film, or other parts within the enclosure.

Attention is directed to Figs. 1 and 3 showing more clearly a pressure roller 9 at the upper part of the drum, bearing against the film and rotatable with the drum and film thereon. This roller 9 is axially parallel to the drum and is mounted upon an arm 48, pivoted as at 49 and normally depressed toward the drum by a suitable spring 50. An extension 51 from said arm 48 projects beneath an adjusting screw 52, the outer end of said screw being accessible at the outside of the casing. By virtue of this pressure roller 9, the film is held in place upon the drum and in connection with the looseness of the film approaching the drum, the pressure roller and drum will eliminate all vibration in the film after passing said pressure roller.

It is within the scope of the present invention to mount the drum or carrier otherwise than upon a hub. As illustrative of this construction, I have shown an arrangement in Figs. 9 and 10 wherein the drum or carrier comprises separate parallel and co-axial rings 53 and 54. Both of these rings are shown as having projecting teeth 11, although other means for holding or guiding the film may be employed. Said rings are of the same outside diameter and of equal diametric thickness, providing inner annular surfaces of identical size. These rings are supported in parallel and axially concentric position by means of a plurality of rollers 55, arranged at intervals around the inner annular surface of the said rings and parallel to the axis of the said ring. The rollers are in turn carried by fixed studs 56 with appropriate intervening anti-friction bearings 57. The rollers are shown somewhat shorter than the studs and are held toward one end of the studs by means of coil springs 58, one upon each stud between the housing and the inner end of the roller. By this construction it will be observed that the rings are rotatable upon the several rollers and will turn at the same rates and in parallel position. Preferably the rings are retained between annular collars 59 properly positioned upon the said rollers. Since the rings are separate and spaced, a light stream may pass between, and I am thus enabled to affect the light sensitive cell positioned within the rings by the light stream passing through the film between the said rings.

It is furthermore within the scope of the invention to provide a carrier other than a drum, for the film, as by utilization of a plurality of supporting devices around which the film may be carried in an orbital path. Illustrative of this construction Figs. 11 and 12 show a plurality of relatively small drums 60 arranged in a series around the light sensitive cell 30 so that the film will be passed from one drum to the next until carried in front of the light sensitive cell, that is, between the said light sensitive cell and its source of light.

What I claim is:

In combination with a motion picture machine having an intermittent film moving device, a constantly driven film carrying sprocket spaced therefrom so as to permit a loop to be formed in the film between said intermittently driven device and said sprocket, an opening in the casing of said machine for access to said parts for threading said film therethrough, an auxiliary casing adapted to be attached to the casing of said machine and having an opening adapted to align with the opening therein, a drum rotatably mounted within said auxiliary casing, sprocket teeth on said drum to align with the sprocket openings in a motion picture film when the loop of said film is extended to pass around said drum, a spring pressed roller for frictionally holding the end of said film adjacent said intermittently moving device against said drum, said drum being rotated solely by the film passing around it pulled by said constantly driven sprocket, means to frictionally resist the rotation of said drum, and means supported upon said auxiliary casing for translating a sound track on said film into electrical vibrations as said film passes around the periphery of said drum.

LOUIS J. SIMONS.